(12) United States Patent
Zhang et al.

(10) Patent No.: US 9,939,681 B2
(45) Date of Patent: Apr. 10, 2018

(54) LIQUID CRYSTAL DISPLAY MODULE AND LIQUID CRYSTAL DISPLAY DEVICE

(71) Applicants: Xiamen Tianma Micro-electronics Co., Ltd., Xiamen (CN); Tianma Micro-electronics Co., Ltd., Shenzhen (CN)

(72) Inventors: Zhaodong Zhang, Xiamen (CN); Poping Shen, Xiamen (CN); Ling Wu, Xiamen (CN)

(73) Assignees: XIAMEN TIANMA MICRO-ELECTRONICS CO., LTD., Xiamen (CN); TIANMA MICRO-ELECTRONICS CO., LTD., Shenzhen (CN)

(*) Notice: Subject to any disclaimer, the term of this patent is extended or adjusted under 35 U.S.C. 154(b) by 0 days.

(21) Appl. No.: 15/051,950

(22) Filed: Feb. 24, 2016

(65) Prior Publication Data

US 2016/0274416 A1     Sep. 22, 2016

(30) Foreign Application Priority Data

Mar. 16, 2015  (CN) .......................... 2015-10112931.5

(51) Int. Cl.
  *G02F 1/1335*  (2006.01)
(52) U.S. Cl.
  CPC .. *G02F 1/133617* (2013.01); *G02F 1/133514* (2013.01); *G02F 2001/133614* (2013.01); *G02F 2001/133624* (2013.01)

(58) Field of Classification Search
  CPC ......... G02F 1/133617; G02F 1/133514; G02F 2001/133614; G02F 2001/133624
  See application file for complete search history.

(56) References Cited

U.S. PATENT DOCUMENTS

| | | | |
|---|---|---|---|
| 6,243,070 B1* | 6/2001 | Hill ................. | G02F 1/133514 345/589 |
| 2003/0026096 A1* | 2/2003 | Ellens ............... | G02F 1/133603 362/231 |

(Continued)

FOREIGN PATENT DOCUMENTS

| | | |
|---|---|---|
| CN | 101004512 A | 7/2007 |
| CN | 101256304 A | 9/2008 |

(Continued)

*Primary Examiner* — Donald Raleigh
(74) *Attorney, Agent, or Firm* — Anova Law Group, PLLC

(57) ABSTRACT

A liquid crystal display (LCD) module is provided. The LCD module comprises a backlight system, a color film substrate arranged opposite to the backlight system, and a thin film transistor (TFT) substrate disposed between the backlight system and the color film substrate. The backlight system emits visible light including red light, green light, blue light and at least one of cyan light, yellow light and magenta light. The red light, green light, blue light and at least one of the cyan light, yellow light and magenta light are mixed together to generate white light. The color film substrate includes a plurality of color barriers including red color barriers, green color barriers, blue color barriers, at least one of cyan, yellow, and magenta color barriers corresponding to colors of the visible light emitted from the backlight system, respectively. The TFT substrate includes a plurality of pixel units.

11 Claims, 3 Drawing Sheets

(56) References Cited

U.S. PATENT DOCUMENTS

| | | | | |
|---|---|---|---|---|
| 2007/0296886 | A1* | 12/2007 | Inada | G02F 1/133603 349/61 |
| 2012/0320607 | A1* | 12/2012 | Kinomoto | H01L 27/322 362/351 |
| 2012/0326180 | A1* | 12/2012 | Ohe | H01L 27/322 257/88 |
| 2014/0226110 | A1* | 8/2014 | Doyle | G02F 1/133603 349/69 |
| 2015/0185540 | A1* | 7/2015 | Ozeki | G02F 1/133308 348/739 |
| 2015/0212352 | A1* | 7/2015 | Guo | G02F 1/133617 349/71 |

FOREIGN PATENT DOCUMENTS

| | | |
|---|---|---|
| CN | 101655638 A | 2/2010 |
| CN | 101676598 A | 3/2010 |
| CN | 101852342 A | 10/2010 |
| CN | 102478187 A | 5/2012 |
| CN | 102563458 A | 7/2012 |
| CN | 102654684 A | 9/2012 |
| CN | 103277710 A | 9/2013 |
| JP | 2007133059 A | 5/2007 |
| JP | 2013080148 A | 5/2013 |
| KR | 20060065377 A | 6/2006 |
| WO | 2014034485 A1 | 3/2014 |

\* cited by examiner

LIQUID CRYSTAL DISPLAY MODULE AND LIQUID CRYSTAL DISPLAY DEVICE

CROSS-REFERENCES TO RELATED APPLICATIONS

This application claims the priority of Chinese patent application No. CN201510112931.5, filed on Mar. 16, 2015, the entire content of which is incorporated herein by reference.

FIELD OF THE DISCLOSURE

The present disclosure relates to the field of flat panel display technology and, more particularly, relates to a liquid crystal display module and a liquid crystal display device.

BACKGROUND

Liquid crystal display (LCD), with advantages such as light weight, thin thickness, and low power consumption, etc., has been widely used in televisions, mobile phones, monitors and other electronic products.

Currently, colors displayed in the LCD are usually generated by a backlight system and a color film substrate. The backlight system includes blue light emitting diodes (LEDs), and red phosphors and green phosphors disposed on the blue LEDs. The color film substrate includes red color barriers, green color barriers and blue color barriers. However, the color gamut of the LCD is a triangle shape mainly consisting of red color, green color and blue color, which is about 85% of National Television Standards Committee (NTSC) standard and thereby affects the image quality.

The disclosed LCD modules and LCD devices are directed to solve one or more problems in the art.

BRIEF SUMMARY OF THE DISCLOSURE

One aspect of the present disclosure provides a liquid crystal display (LCD) module. The LCD module comprises a backlight system, a color film substrate arranged opposite to the backlight system, and a thin film transistor (TFT) substrate disposed between the backlight system and the color film substrate. The backlight system emits visible light including red light, green light, blue light and at least one of cyan light, yellow light and magenta light. The red light, green light, blue light and at least one of the cyan light, yellow light and magenta light are mixed together to generate white light. The color film substrate includes a plurality of color barriers including red color barriers, green color barriers, blue color barriers, at least one of cyan, yellow, and magenta color barriers corresponding to colors of the visible light emitted from the backlight system, respectively. The TFT substrate includes a plurality of pixel units.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the invention, which are illustrated in the accompanying drawings. Hereinafter, embodiments consistent with the disclosure will be described with reference to drawings. Wherever possible, the same reference numbers will be used throughout the drawings to refer to the same or like parts. It is apparent that the described embodiments are some but not all of the embodiments of the present invention. Based on the disclosed embodiments, persons of ordinary skill in the art may derive other embodiments consistent with the present disclosure, all of which are within the scope of the present invention.

Figure 1:
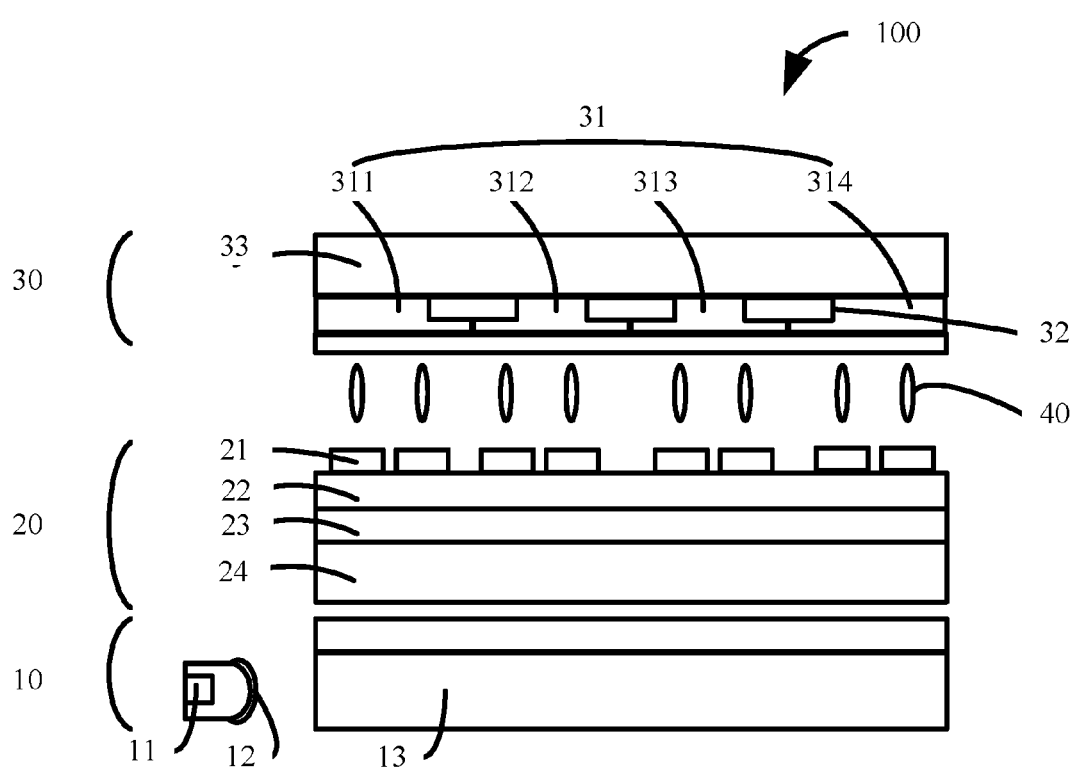
FIG. 1 illustrates a cross-sectional view of an exemplary liquid crystal display module consistent with disclosed embodiments.

FIG. 1 illustrates a cross-sectional view of an exemplary liquid crystal display module consistent with disclosed embodiments. As shown in FIG. 1, the LCD module 100 may include a backlight system 10, a thin film transistor (TFT) substrate 20, a liquid crystal layer 40 and a color film substrate 30. The backlight system 10 may emit red light, green light, blue light and at least one of cyan light, yellow light and magenta light. The red light, green light, blue light and at least one of the cyan light, yellow light and magenta light may be mixed together to generate white light.

The backlight system 10 may be a back-lit backlight system or an edge-lit back light system. In the disclosed embodiments, the backlight system 10 may be an edge-lit back light system, which may include a light source 11, a phosphor layer 12 disposed on the light source, and a light guide plate 13. The light guide plate 13 may be arranged opposite to the TFT array substrate 20, and the light source 11 may be disposed at one side of the light guide plate 13.

The light source 11 may include blue LEDs, ultraviolet (UV) LEDs or other LEDs. In the disclosed embodiments, the light source 11 may include UV LEDs. Phosphor types in the phosphor layer 12 may be selected according to the light source 11 types. Further, when the phosphors types in the phosphor layer 12 and the light sources 11 types are determined, ratios of the various phosphors in the phosphor layer 12 may be adjusted to generate white light.

For example, when the light source 11 includes blue LEDs, the phosphor layer 12 may include red phosphors, green phosphors and at least one of cyan phosphors and yellow phosphors. Thus the blue light emitted by the light source 11 may excite the red phosphors, green phosphors and at least one of the cyan phosphors and yellow phosphors to emit light having corresponding peak wavelengths, which may be eventually mixed together to generate a white light emission.

When the light source 11 includes UV LEDs, the phosphor layer 12 may include red phosphors, green phosphors, blue phosphors, and at least one of cyan phosphors, yellow phosphors and magenta phosphors. Thus the UV light emitted by the light source 11 may excite the red phosphors, green phosphors, blue phosphors, and at least one of the cyan phosphors, yellow phosphors and magenta phosphors to emit light having corresponding peak wavelengths, which may be eventually mixed together to generate a white light emission.

Figure 2:
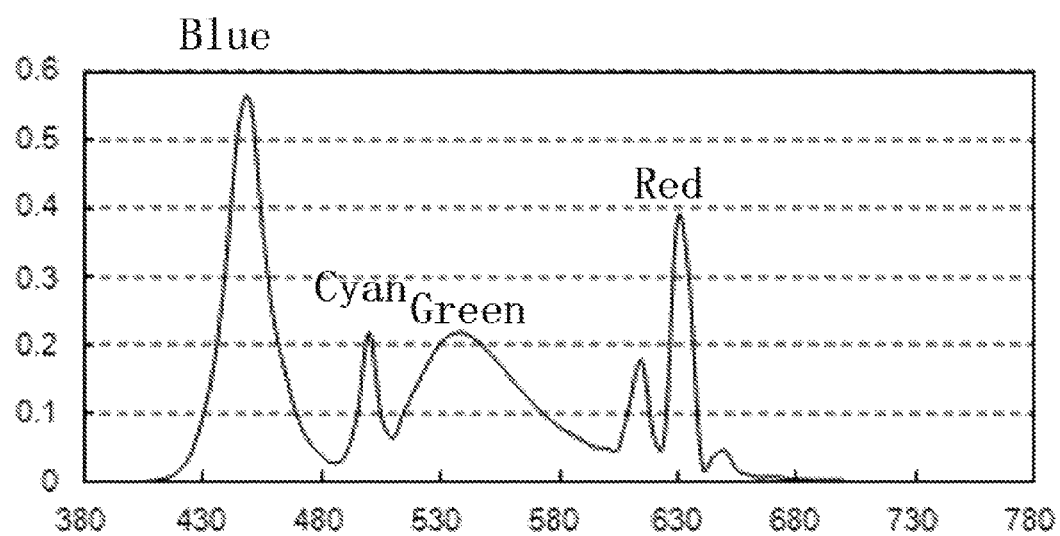
FIG. 2 illustrates a backlight system spectrum in an exemplary liquid crystal display module in FIG. 1 consistent with disclosed embodiments.

FIG. 2 illustrates a backlight system spectrum in an exemplary liquid crystal display module in FIG. 1 consistent with disclosed embodiments. The phosphor layer 12 may include red phosphors, green phosphors, blue phosphors and cyan phosphors. Thus the UV light emitted by the light source 11 may excite the red phosphors, green phosphors, blue phosphors and cyan phosphors to emit light having a red peak wavelength, a green peak wavelength, a blue peak wavelength and a cyan peak wavelength, respectively, as shown in FIG. 2. The red light, green light, blue light and cyan light may be mixed together to generate white light incident on the light guide plate 13. The light guide plate 13 may be selected from convention light guide plates, and the structures are not going to be explained here.

Retuning to FIG. 1, the TFT array substrate 20 may be disposed between the backlight system 10 and the light guide plate 13. The TFT array substrate 20 may have various types of structures, such as Fringe Field Switching (FFS) type, In-Plane Switching (IPS) type, or other types of structures. In the disclosed embodiments, the TFT array substrate 20 may have a FFS type structure. The TFT array substrate 20 may include a first substrate 24, a common electrode 23, an insulating layer 22, and a plurality of pixel electrodes 21.

The common electrode 23, the insulating layer 22 and the pixel electrodes 21 may be sequentially disposed on a surface of the first substrate 24 away from the light guide plate 13. The common electrode 23 and the plurality of pixel electrodes 21 on the TFT array substrate 20 may define a plurality of pixel units. The types of pixel units may be the same as the types of the visible light which are mixed together to generate the white light emitted from the backlight system 10.

For example, when the light source 11 include blue LEDs and the phosphor layer 12 includes three types of phosphors, i.e., red phosphors, green phosphors and cyan phosphors, the TFT array substrate 20 may include four types of pixel units, i.e., blue pixel units, red pixel units, green pixel units, and cyan pixel units.

When the light source includes UV LEDs and the phosphor layer 12 includes six types of phosphors, i.e., red phosphors, green phosphors, blue phosphors, cyan phosphors, yellow phosphors and magenta phosphors, because the UV light emitted by the UV LEDs is invisible, the TFT array substrate 20 may only include six types of pixel units, i.e., red pixel units, green pixel units, blue pixel units, cyan pixel units, yellow pixel units and magenta pixel units.

In the disclosed embodiments, because the light source may include UV LEDs and the phosphor layer 12 may include four types of phosphors, i.e., red phosphors, green phosphors, blue phosphors and cyan phosphors, the TFT array substrate 20 may only include four types of pixel units, i.e., red pixel units, green pixel units, blue pixel units and cyan pixel units.

Further, the liquid crystal layer 40 may be disposed between the TFT array substrate 20 and the color film substrate 30. The liquid crystal layer 40 may include conventional liquid crystal materials, and the details are not going to be explained here.

The color film substrate 30 may include a plurality of color barrier units 31, a black matrix 32 and a second substrate 33. The color barrier units 31 and the black matrix may be disposed on a surface of the second substrate 33. Each color barrier unit 31 may include a plurality of color barriers and the black matrix 32 may be disposed among the adjacent color barriers. The types of color barriers in color barrier units 31 may be the same as the types of the visible light emitted from the backlight system 10.

For example, when the backlight system 10 emits red light, green light, blue light and cyan light (i.e. light in four colors), each color barrier unit 31 may include four color barriers having different colors, i.e., a red color barrier, a green color barrier, a blue color barrier and a cyan color barrier.

When the backlight system 10 emits red light, green light, blue light and yellow light (i.e. light in four colors), each color barrier unit 31 may include four color barriers having different colors, i.e. a red color barrier, a green color barrier, a blue color barrier and a yellow color barrier.

When the backlight system 10 emits red light, green light, blue light, cyan light and yellow light (i.e. light in five colors), each color barrier unit 31 may include five color barriers having different colors, i.e., a red color barrier, a green color barrier, a blue color barrier, a cyan color barrier and a yellow color barrier.

When the backlight system 10 emits red light, green light, blue light, cyan light, yellow light and magenta light (i.e., light in six colors), each color barrier unit 31 may include six color barriers having different colors, i.e., a red color barrier, a green color barrier, a blue color barrier, a cyan color barrier, a yellow color barrier and a magenta color barrier.

In the disclosed embodiments, each color barrier unit 31 may include four color barriers of different colors, i.e., a red color barrier 311, a green color barrier 312, a blue color barrier 313 and a cyan color barrier 314. The red color barrier 311, green color barrier 312, blue color barrier 313 and cyan color barrier 314 may be separated by the black matrix 32.

Figure 3:
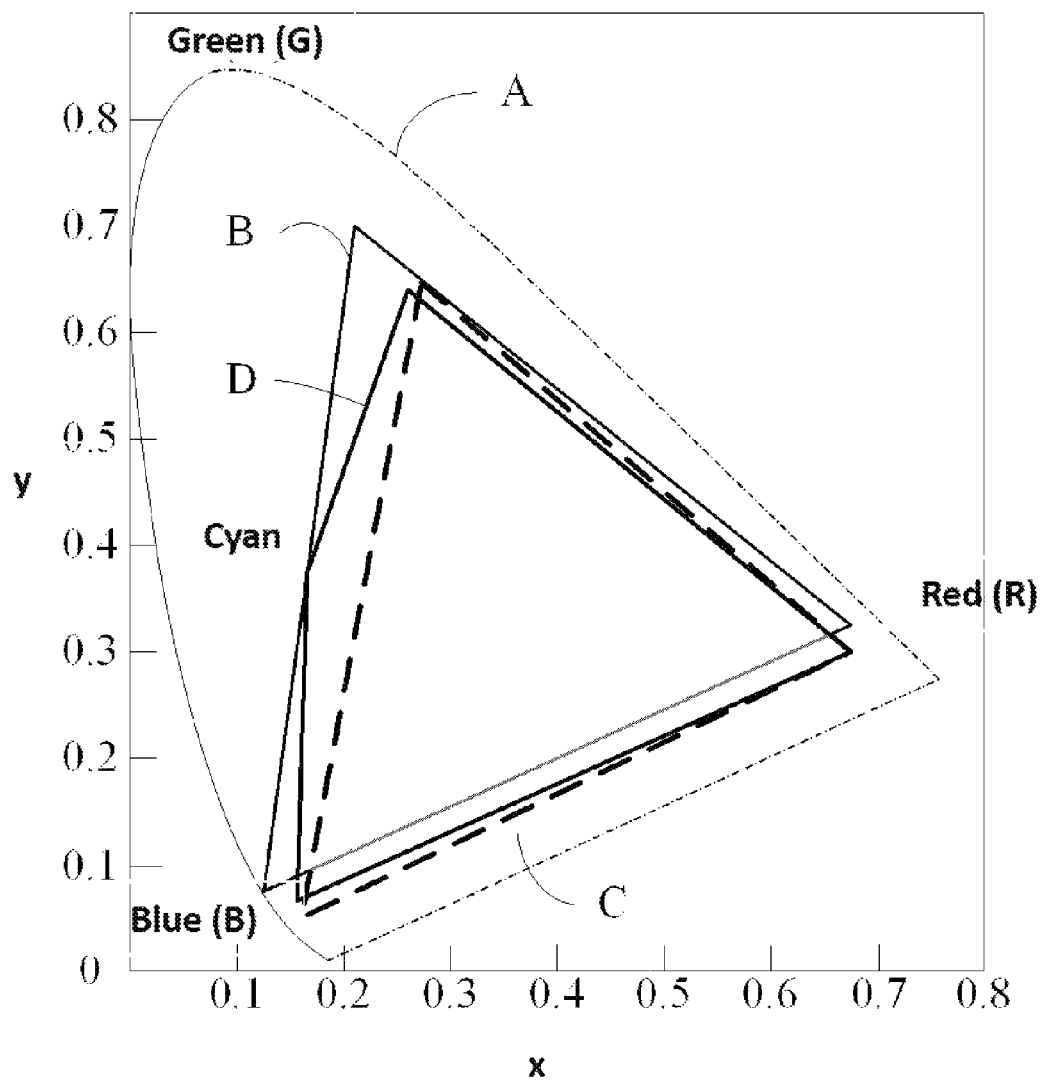
FIG. 3 illustrates a xy chromaticity diagram showing a comparison between a color gamut of a conventional liquid crystal display module and a color gamut of an exemplary liquid crystal display module consistent in FIG. 1 with disclosed embodiments.

FIG. 3 illustrates an xy chromaticity diagram showing a comparison between a color gamut of a conventional LCD module and a color gamut of an exemplary LCD module consistent in FIG. 1 with disclosed embodiments. The color gamut is usually calculated based on Tristimulus method, which is basically a three-valued system that models the appearance of color by human eye. This method, established and developed by the International Commission on Illumination (CIE).

As shown in FIG. 3, region A represents an xy color gamut of the XYZ color system established by the CIE. Region B (solid line triangle) represents a standard color gamut for color television broadcasting system established by the National Television System Committee (NTSC). Region C (dotted line triangle) represents a color gamut of the conventional LCD module, and region D (solid line quadrilateral area) represents a color gamut of the disclosed LCD module 100. As shown in FIG. 3, the color gamut of the conventional LCD module is small, which is only about 85% of NTSC standard, while the color gamut of the disclosed LCD module 100 may be 95% of NTSC standard.

In the disclosed embodiments, when only introducing the cyan light and the corresponding cyan color barriers, the color gamut of the LCD module 100 may only expand towards the cyan color gamut region. Further introducing the magenta light and the corresponding magenta color barriers or the yellow light and the corresponding yellow color barriers, the color gamut of the LCD module 100 may expand towards the magenta color gamut region or the yellow color gamut region, receptively. Thus the color gamut of the LCD module as well as the image quality may be improved. The color gamut of the disclosed LCD module

100 may be represented by a polygonal region, such as quadrilateral region, a quinquangular region and etc.

Other applications, advantages, alternations, modifications, or equivalents to the disclosed embodiments are obvious to those skilled in the art. It is intended that the specification and embodiments be considered as exemplary only, with a true scope and spirit of the invention being indicated by the claims.

What is claimed is:

1. A liquid crystal display (LCD) module, comprising:
a backlight system comprising a light source, a phosphor layer disposed on the light source and a light guide plate, the phosphor layer comprising red phosphors, green phosphors, yellow phosphors and at least one of cyan phosphors and magenta phosphors, the light source exciting the phosphor layer to emit visible light including red light, green light, blue light, yellow light and at least one of cyan light and magenta light, wherein the red light, green light, blue light, yellow light and at least one of the cyan light and magenta light are mixed together to generate white light, wherein the red phosphors, the green phosphors, the yellow phosphors and at least one of the cyan phosphors and the magenta phosphors are disposed on the same light source and excited by the same light source;
a color film substrate arranged opposite to the backlight system, wherein the color film substrate includes a plurality of color barriers including red color barriers corresponding to the red light emitted from the red phosphors, green color barriers corresponding to the green light emitted from the green phosphors, blue color barriers, yellow color barriers corresponding to the yellow light emitted from the yellow phosphors, and at least one of cyan color barriers corresponding to the cyan light emitted from the cyan phosphors and magenta color barriers corresponding to the magenta light emitted from the magenta phosphors; and
a thin film transistor (TFT) substrate disposed between the backlight system and the color film substrate, wherein the TFT substrate includes a plurality of pixel units,
wherein the backlight system is an edge-lit back light system, the light guide plate has a first side facing the TFT substrate, an opposing side and at least one side wall, and the light source and the phosphor layer disposed on the light source are disposed at the at least one side wall of the light guide plate.

2. The LCD module according to claim 1, wherein:
the backlight system includes a light emitting diode (LED) light source; and
the phosphor layer is disposed on the LED light source.

3. The LCD module according to claim 1, wherein:
the backlight system emits the red light, the green light, the blue light, the yellow light and the cyan light.

4. The LCD module according to claim 3, wherein:
the backlight system includes blue LEDs;
the red phosphors, the green phosphors, the yellow phosphors and the cyan phosphors are disposed on the blue LEDs; and
the color film substrate includes a plurality of red color barriers, a plurality of green color barriers, a plurality of blue color barriers, a plurality of yellow color barriers and a plurality of cyan color barriers corresponding to the red light emitted from the red phosphors, the green light emitted from the green phosphors, the blue light emitted from the blue LEDs, the yellow light emitted from the yellow phosphors, and the cyan light emitted from the cyan phosphors, respectively.

5. The LCD module according to claim 3, wherein:
the backlight system includes ultraviolet (UV) LEDs;
the phosphor layer further comprises blue phosphors;
the red phosphors, the green phosphors, the yellow phosphors, the blue phosphors and the cyan phosphors are disposed on the UV LEDs; and
the color film substrate includes a plurality of red color barriers, a plurality of green color barriers, a plurality of blue color barriers, a plurality of yellow color barriers, and a plurality of cyan color barriers corresponding to the red light emitted from the red phosphors, the green light emitted from the green phosphors, the blue light emitted from the blue phosphors, the yellow light emitted from the yellow phosphors, and the cyan light emitted from the cyan phosphors, respectively.

6. The LCD module according to claim 1, wherein:
the backlight system emits the red light, the green light, the blue light, the yellow light and the magenta light.

7. The LCD module according to claim 6, wherein:
the backlight system includes UV LEDs;
the phosphor layer further comprises blue phosphors;
the red phosphors, the green phosphors, the blue phosphors, the yellow phosphors and the magenta phosphors are disposed on the UV LEDs; and
the color film substrate includes a plurality of red color barriers, a plurality of green color barriers, a plurality of blue color barriers, a plurality of yellow color barriers, and a plurality of magenta color barriers corresponding to the red light emitted from the red phosphors, the green light emitted from the green phosphors, the blue light emitted from the blue phosphors, the yellow light emitted from the yellow phosphors, and the magenta light emitted from the magenta phosphors, respectively.

8. The LCD module according to claim 1, wherein:
the backlight system emits the red light, the green light, the blue light, the yellow light, the cyan light and the magenta light.

9. The LCD module according to claim 8, wherein:
the backlight system includes UV LEDs;
the phosphor layer further comprises blue phosphors;
the red phosphors, the green phosphors, the blue phosphors, the yellow phosphors, the cyan phosphors and the magenta phosphors are disposed on the UV LEDs; and
the color film substrate includes a plurality of red color barriers, a plurality of green color barriers, a plurality of blue color barriers, a plurality of yellow color barriers, a plurality of cyan color barriers, and a plurality of magenta color barriers corresponding to the red light emitted from the red phosphors, the green light emitted from the green phosphors, the blue light emitted from the blue phosphors, the yellow light emitted from the yellow phosphors, the cyan light emitted from the cyan phosphors, and the magenta light emitted from the magenta phosphors, respectively.

10. The LCD module according to claim 6, wherein:
the backlight system includes blue LEDs;
the red phosphors, the green phosphors, the yellow phosphors and the magenta phosphors are disposed on the blue LEDs; and
the color film substrate includes a plurality of red color barriers, a plurality of green color barriers, a plurality of blue color barriers, a plurality of yellow color barriers, and a plurality of magenta color barriers corresponding to the red light emitted from the red phosphors, the green light emitted from the green phosphors, the blue light emitted from the blue LEDs, the yellow light emitted from the yellow phosphors, and the magenta light emitted from the magenta phosphors, respectively.

11. The LCD module according to claim 8, wherein:

the backlight system includes blue LEDs;

the red phosphors, the green phosphors, the yellow phosphors, the cyan phosphors and the magenta phosphors are disposed on the blue LEDs; and the color film substrate includes a plurality of red color barriers, a plurality of green color barriers, a plurality of blue color barriers, a plurality of yellow color barriers, a plurality of cyan color barriers, and a plurality of magenta color barriers corresponding to the red light emitted from the red phosphors, the green light emitted from the green phosphors, the blue light emitted from the blue LEDs, the yellow light emitted from the yellow phosphors, the cyan light emitted from the cyan phosphors, and the magenta light emitted from the magenta phosphors, respectively.

* * * * *